United States Patent [19]

Taguchi et al.

[11] Patent Number: 5,452,649
[45] Date of Patent: Sep. 26, 1995

[54] FOOD STERILIZING APPARATUS

[75] Inventors: Masao Taguchi; Yoshitaka Hirano; Koji Sengoku, all of Chiba; Masayuki Nakatani, Nagoya; Mahito Orii, Chiba; Akifumi Fujita, Ichihara, all of Japan

[73] Assignee: House Foods Corporation, Osaka, Japan

[21] Appl. No.: 395,111

[22] Filed: Feb. 27, 1995

[51] Int. Cl.⁶ ........................................... A23L 3/00
[52] U.S. Cl. ................... 99/470; 99/361; 99/483
[58] Field of Search ............... 99/467, 470, 483, 99/516, 536, 359–361, 365–371; 422/25, 26, 32, 113, 296, 297, 302, 304, 307, 310; 426/407, 521, 511

[56] References Cited

U.S. PATENT DOCUMENTS

| | | | |
|---|---|---|---|
| 3,927,976 | 12/1975 | Reimers et al. | 422/296 |
| 3,970,188 | 7/1976 | Smorenburg | 99/360 |
| 4,169,408 | 10/1979 | Mencacci | 99/367 |
| 4,525,978 | 7/1985 | Hayase et al. | 53/167 |
| 4,539,903 | 9/1985 | Sugisawa et al. | 99/470 |
| 4,646,629 | 3/1987 | Creed et al. | 99/483 |
| 4,661,325 | 4/1987 | Noro et al. | 422/304 |
| 4,690,699 | 9/1987 | Sugisawa et al. | 422/292 |
| 4,773,321 | 9/1988 | Wijts . | |
| 4,861,559 | 8/1989 | Sugisawa et al. | 422/113 |
| 4,874,580 | 10/1989 | Sugisawa et al. | 422/25 |
| 4,884,498 | 12/1989 | Sengoku et al. | 426/511 |
| 5,152,900 | 10/1992 | Sekiguchi et al. | 210/644 |

FOREIGN PATENT DOCUMENTS

| | | |
|---|---|---|
| 49-71177 | 7/1974 | Japan . |
| 50-88251 | 7/1975 | Japan . |
| 51-42391 | 4/1976 | Japan . |
| 56-121468 | 9/1981 | Japan . |
| 5-30952 | 2/1993 | Japan . |

*Primary Examiner*—Timothy F. Simone
*Attorney, Agent, or Firm*—Popham, Haik, Schnobrich & Kaufman, Ltd.

[57] ABSTRACT

A food sterilizing apparatus has a simple configuration and can completely and efficiently sterilize food. The food sterilizing apparatus is designed to sterilize food contained in rigid food containers and comprises a food supplying section, a linear cylindrical heater, a linear cylindrical cooler and a discharge section, each having inlet and outlet ports arranged respectively at the upstream and downstream ends thereof, any two adjacent ones of said component sections being connected in parallel or rectangularly with each other at the respective outlet and inlet ports thereof with a sealing gate interposed therebetween, said component sections being further provided with respective pushers disposed at the upstream end thereof for moving rigid food containers downstream, each of said pushers having a stroke at least equal to the width of a rigid container.

6 Claims, 2 Drawing Sheets

FOOD STERILIZING APPARATUS

BACKGROUND OF THE INVENTION

1. Field of the Invention

This invention relates to a food sterilizing apparatus capable of successively carrying out steps of sterilizing and cooling food contained in rigid containers.

2. Prior Art

Conventionally, solid ingredients of nourishing preparations containing both solid and liquid such as stew and sold as preservable food in retort pouches are sterilized on a batch basis in sterilizing vessels before being retrieved for packaging. For example, Japanese Patent Publication No. 56-121468 discloses a sterilizing apparatus for producing sterilized solid food where granular solid food is mixed with liquid serving as a heat transmitting medium, heated, sterilized and then separated again from the liquid. However, the apparatus has drawbacks that it requires cumbersome operations of mixing solid with liquid before heating and sterilizing the food and pumping out the liquid after the completion of sterilization and that the solid food is liable to be broken as the container of the apparatus is rotated while the food is heated for sterilization.

Japanese Patent Publication No. 50-88251 discloses a sterilizing apparatus for sterilizing food in containers comprising a sterilizing chamber provided with inlet and outlet ports and a conveyor belt running through the inlet and outlet ports such that containers containing food are sequentially moved into the chamber by the conveyor belt and the food in the containers is heated and sterilized while moving in the chamber between the inlet and outlet ports. However, a major drawback of the apparatus is that the sterilizing chamber is not sealed and therefore the sterilizing effect of the apparatus is inevitably insufficient.

Japanese Patent Publication No. 49-71177 discloses a boiling/sterilizing apparatus comprising a boiler tank provided with an inlet air lock and an outlet air lock, a boiling/sterilizing chamber and an endless conveyor belt arranged below the boiling/sterilizing chamber. However, the apparatus has a major drawback that the sterilizing chamber cannot be sealed off for effective sterilizing operation because an endless conveyor belt is arranged inside the tank.

Japanese Patent Publication No. 51-42391 discloses a high temperature sterilizing apparatus comprising a vessel divided into a plurality of continuously arranged chambers, wherein any two adjacent chambers are separated from each other by a partition wall that can be moved for opening and closing. However, a major drawback of the apparatus is that a plurality of mutually independent conveyors have to be arranged within the each chambers to make the overall configuration of the apparatus rather complicated.

Japanese Patent Publication No. 5-30952 discloses a high temperature sterilizing apparatus comprising a heating/sterilizing chamber, a cooling chamber and an air blower arranged within a housing and an endless conveyor belt running through the chambers and the blower and extending to the outside of the housing. However, the apparatus has a major drawback that the heating/sterilizing chamber, the cooling chamber and the air blower cannot be efficiently designed because of the endless conveyor belt running therethrough.

In view of the above identified problems of existing food sterilizing apparatuses, the object of the invention is to provide a food sterilizing apparatus having a simple configuration and capable of completely and efficiently sterilizing food.

SUMMARY OF THE INVENTION

According to the invention, the above object is achieved by providing a food sterilizing apparatus for sterilizing food contained in rigid containers characterized in that it comprises a food supplying section, a linear cylindrical heater, a linear cylindrical cooler and a delivery section, each having inlet and outlet ports arranged respectively at the upstream and downstream ends thereof, any two adjacent ones of said component sections being connected in parallel or rectangularly with each other at the respective outlet and inlet ports thereof with a sealing gate interposed therebetween, said component sections being further provided with respective pushers disposed at the upstream end thereof for moving rigid food containers downstream, each of said pushers having a stroke at least equal to the width of a rigid container.

Now, the present invention will be described in greater detail by referring to the accompanying drawings that illustrate preferred embodiments of the invention.

DETAILED DESCRIPTION OF THE INVENTION

Figure 1:
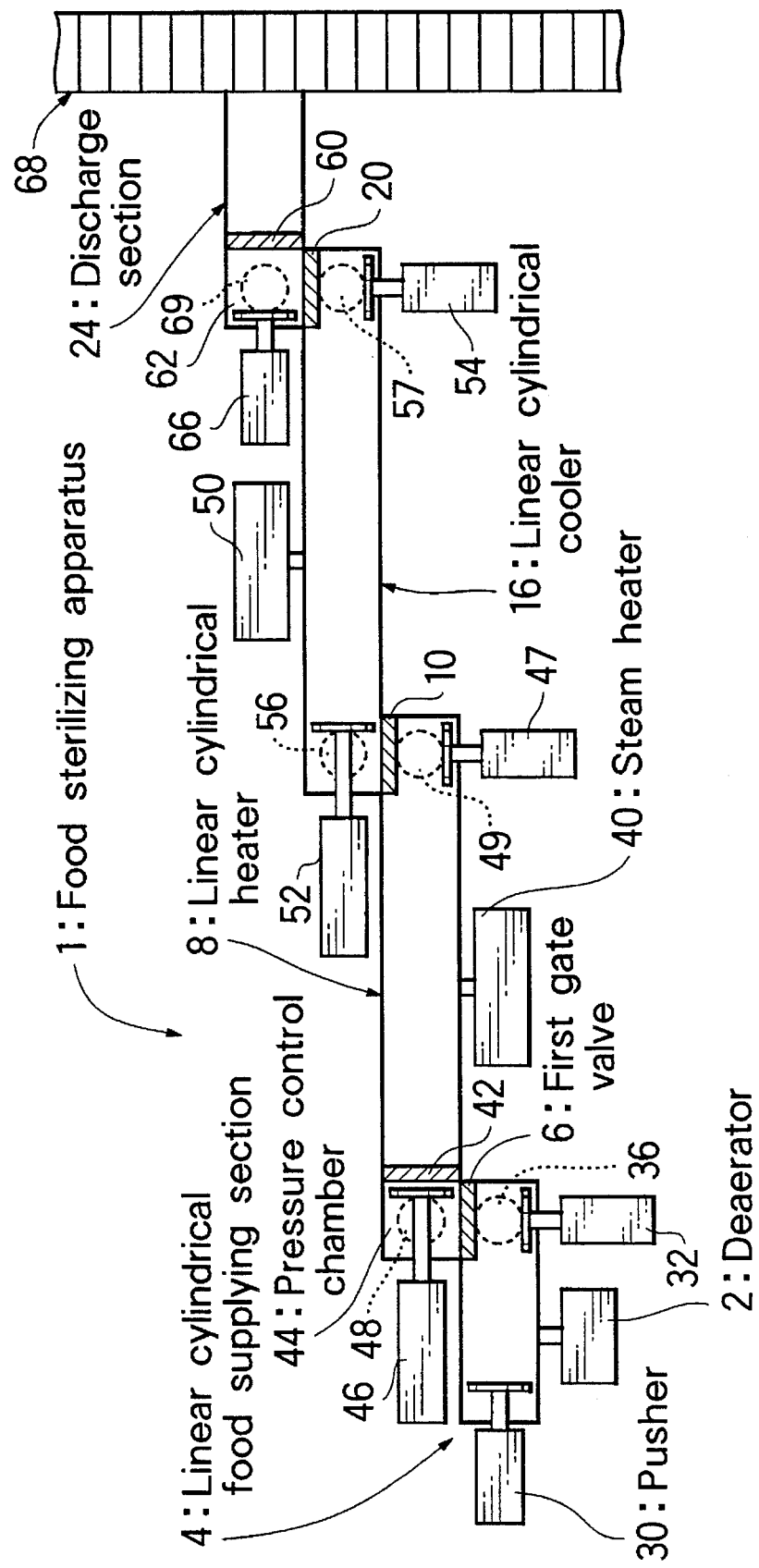
FIG. 1 is a schematic view of a first embodiment of food sterilizing apparatus according to the invention, illustrating its configuration.

In FIG. 1, schematically illustrating a first preferred embodiment of the invention, a food sterilizing apparatus generally denoted by reference numeral 1 comprises a linear cylindrical food supplying section 4 held in communication with a deaerator 2, a linear cylindrical heater 8 arranged in parallel with the linear cylindrical food supplying section 4 with a pressure control chamber 44 interposed therebetween, said pressure control chamber 44 being laterally defined by a first gate valve 6 and a fourth gate valve 42, a linear cylindrical cooler 16 arranged in parallel with the linear cylindrical heater 8 with a second gate valve 10 interposed therebetween and a discharge section 24 arranged in parallel with the linear cylindrical cooler 16 with a pressure control chamber 62 interposed therebetween, said pressure control chamber 62 being laterally defined by a third gate valve 20 and a fifth gate valve 60.

The linear cylindrical food supplying section 4 has an internal length of about 60cm and is provided at an end thereof with a pusher 30 for axially and longitudinally pushing and moving forward rigid food containers and at the opposite end thereof with another pusher 32 for pushing and moving rigid food containers in a direction of a right angle to the axis of the food supplying section 4, said pusher 32 being so designed as to extend and push rigid food containers through the first gate valve 6 into a pressure control chamber 44 arranged upstream relative to the linear cylindrical heater 8. The linear cylindrical food supplying section 4 is also provided at the downstream inner end thereof with a turn table 36 for rotating rigid food containers by 90°.

The linear cylindrical heater 8 has an internal length of about 180 cm and is connected to a steam heater 40 and provided at the upstream end thereof with a pressure control chamber 44 laterally defined by a fourth gate valve 42 and a pusher 46 for pushing and moving forward rigid food containers through a fourth gate valve 42. Rigid food containers such as retainers filled with food may be arranged in a line such that the front end retainer of the line is pushed into the next processing step by pushing and moving forward the rear end retainer of the line.

The linear cylindrical heater 8 is provided at the downstream end thereof with a pusher 47 for pushing rigid food containers in a direction of a right angle to the axis of the heater 8, said pusher 47 being so designed as to extend and push rigid food containers through a second gate valve 10 into a linear cylindrical cooler 16. The pressure control chamber 44 is in the inside with a turn table 48 for rotating rigid food containers by 90°. Likewise, the linear cylindrical heater 8 is also provided at the downstream inner end thereof with a similar turn table 49 for rotating rigid food containers by 90°.

The linear cylindrical cooler 16 has an internal length of about 180 cm and is connected to a cooling device 50 and provided at the upstream end thereof with a pusher 52 for pushing and moving forward rigid food containers. The linear cylindrical cooler 16 is additionally provided at the downstream end thereof with another pusher 54 pushing rigid food containers in a direction of a right angle to the axis of the cooler 16, said pusher 54 being so designed as to extend and push rigid food containers through a third gate valve 20 into a pressure control chamber 62 disposed upstream relative to the discharge section 24. The linear cylindrical cooler 16 is additionally provided at the upstream and downstream ends thereof with respective turn tables 56, 57 for rotating rigid food containers by 90°.

The discharge section 24 has an internal length of about 60 cm and is provided at the upstream end thereof with a pressure control chamber 62 laterally defined by a fifth gate valve 60 and a pusher 66 for pushing and moving forward rigid food containers through a fifth gate valve 60. The discharge section 24 is additionally provided at the downstream end thereof with a conveyor device 68 for conveying food in rigid food containers. The pressure control chamber 62 is provided in the inside with a turn table for rotating rigid food containers by 90°.

The first embodiment of food sterilizing apparatus according to the invention and having a configuration as described above operates in a manner as follows. Food contained in containers, for example, retainers are fed to the linear cylindrical food supplying section 4 and the deaerator 2 is driven to feed steam to the retainers from the bottom and draw the steam upward in order to remove any air existing among particles of the food in the retainers. Thereafter, two retainers containing food are pushed and moved at a time by the pusher 30 onto the turn table 36, which is then rotated by 90°.

Subsequently, the first gate valve 6 is opened and the two retainers on the turn table 36 are pushed and moved onto the turn table 48 by the pusher 32. The extended pusher 32 is then retracted to the original position and the turn table 48 is rotated by 90° so that the longitudinal axis of the two retainers on the turn table 48 is aligned with the axis of the linear cylindrical heater 8. At this stage of operation, both the first and fourth gate valves 6 and 42 are closed. Steam is then fed into the pressure control chamber 44 under this condition until the inner pressure of the pressure control chamber 44 becomes equal to that of the linear cylindrical heater 8., When the inner pressures of the pressure control chamber 44 and the linear cylindrical heater 8 are made equal to each other, the fourth gate valve 42 is opened and the retainers on the turn table 48 are pushed and moved into the linear cylindrical heater 8 by the pusher 46.

Then, the fourth gate valve 42 is closed and the steam heater 40 is driven to heat and sterilize the food in the retainers. Meanwhile, the inner pressure of the pressure control chamber 44 is regulated to become equal to that of the linear cylindrical food supplying section 4 and two other retainers are fed into the pressure control chamber 44 from the linear cylindrical food supplying section 4 and placed on the turn table 48, which is then rotated by 90° so that the longitudinal axis of the two retainers on the turn table 48 is aligned with the axis of the linear cylindrical heater 8 and the retainers are made ready to move into the linear cylindrical heater 8. Thereafter, the fourth gate valve 42 is opened again and the retainers on the turn table 48 are pushed and moved into the linear cylindrical heater 8 by the pusher 46 until the two retainers at the other end of the linear cylindrical heater 8 are moved onto the turn table 49 located at the downstream end of the linear cylindrical heater 8, whereby the turn table 49 is rotated by 90°. In this manner, as the retainers in the linear cylindrical heater 8 are gradually moved forward through the latter, the food contained in the retainers are heated and sterilized to meet predetermined requirements of sterilization.

As retainers are moved onto the turn table 49, the second gate valve 10 is opened, and the retainers on the table 49 are pushed and moved onto the turn table 56 located in the linear cylindrical cooler 16 by the pusher 47. Note that the inner pressure of the linear cylindrical heater 8 and that of the linear cylindrical cooler 16 are maintained equal to each other at this stage of operation. Thereafter, the turn table 56 is rotated by 90° along with the retainers held thereon, which retainers are then pushed and moved further into the linear cylindrical cooler 16 by the pusher 52. Meanwhile, the food contained in the retainers in the linear cylindrical cooler 16 are cooled by the cooling device 50 as they move though the cooler 16. In this way, additional food retainers are fed onto the turn table 56 and pushed and moved into the linear cylindrical cooler 16 by the pusher 52 so that the retainers in the linear cylindrical cooler 16 are sequentially moved onto the turn table 57 located at the downstream end of the linear cylindrical cooler 16. The food contained in the retainers are incessantly cooled while they move through the linear cylindrical cooler 16. Then, the turn table 57 is rotated by 90° along with the two retainers held thereon and the third gate valve 20 is opened so that they may be moved onto the turn table 69 by the pusher 54. Note that, at this stage of operation, the inner pressure of the pressure control chamber 62 is made equal to that of the linear cylindrical cooler 16.

Thereafter, the third gate valve 20 is closed and the inner pressure of the pressure control chamber 62 is regulated to become equal to that of the discharge section 24. Meanwhile, the turn table 69 is driven to rotate by 90° along with the retainers held thereon and then the fifth gate valve 60 is opened so that the retainers on the turn table 60 may be pushed and moved into the discharge section 24 by the pusher 66. At the same time, the retainers in the discharge section 24 are sequentially moved onto the conveyor device 68 as they are pushed and moved forward by newly fed retainers.

Figure 2:
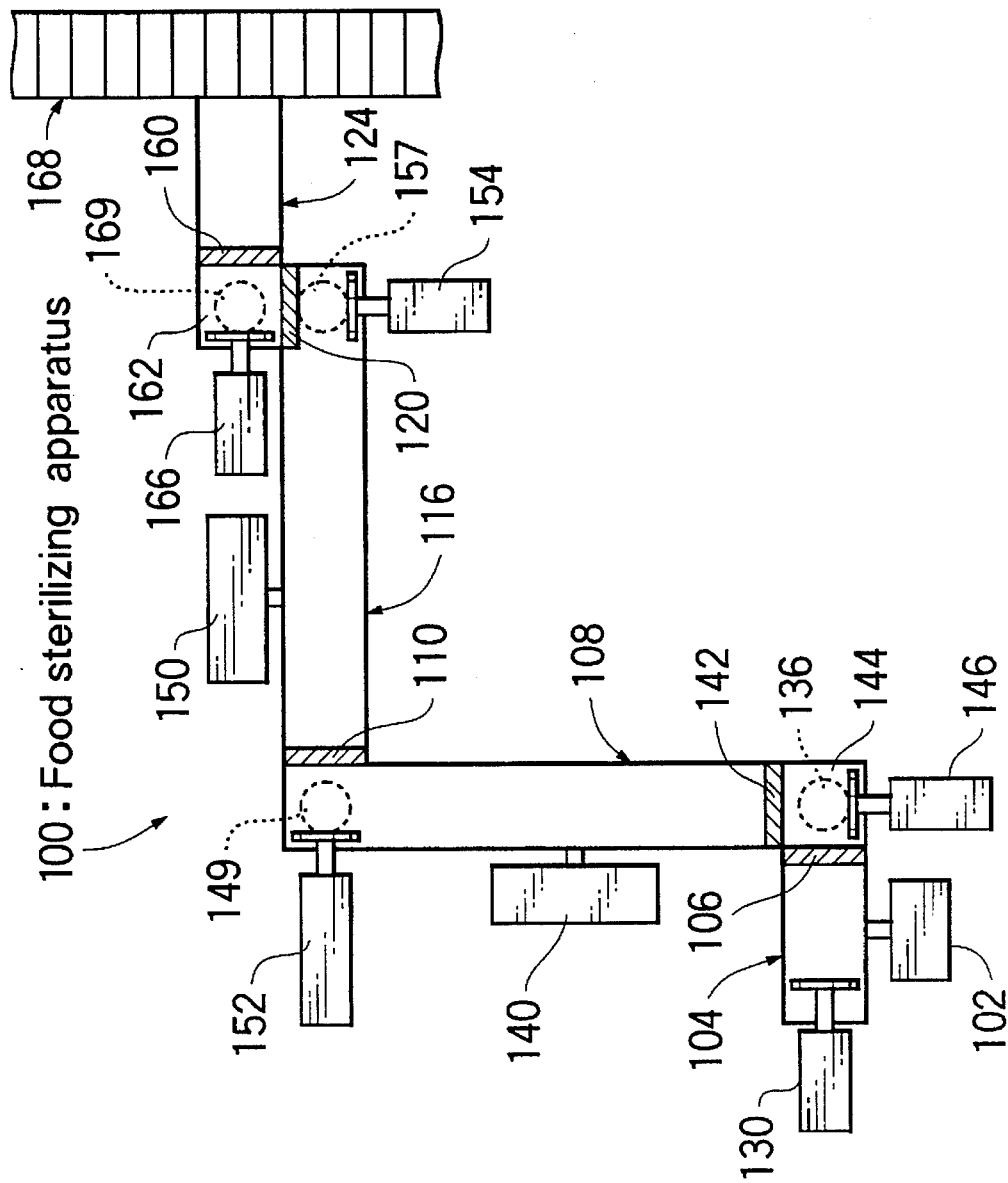
FIG. 2 is a schematic view of a second embodiment of food sterilizing apparatus according to the invention, illustrating its configuration.

FIG. 2 schematically illustrates the configuration of a second embodiment of food sterilizing apparatus according to the invention. Note that the components that are substantially identical with those of the first embodiments are denoted respectively by the same reference numerals prefixed by one hundred and will not be described any further. The food sterilizing apparatus 100 of the second embodiment comprises a linear cylindrical food supplying section 104 held in communication with a deaerator 102, a linear cylindrical heater 108 arranged at a right angle to the linear cylindrical food supplying section 104 with a pressure control chamber 144 interposed therebetween, said pressure control chamber 144 being laterally defined by a first gate valve 106 and a fourth gate valve 142, a linear cylindrical cooler 116 arranged at a right angle to the linear cylindrical heater 108 with a second gate valve 110 interposed therebetween and a discharge section 124 arranged in parallel with the linear cylindrical cooler 116 with a pressure control chamber 162 interposed therebetween, said pressure control chamber 162 being laterally defined by a third gate valve 120 and a fifth gate valve 160.

The linear cylindrical food supplying section 104 has an internal length of about 60 cm and is provided at an end thereof with a pusher 130 for axially pushing and moving forward rigid food containers and at the opposite end thereof with a pressure control chamber 144 that has a pusher 146 for pushing and moving rigid food containers in a direction of a right angle to the axis of the linear cylindrical food supplying section 104. The pusher 146 extends and moves rigid food containers through the first gate valve 142 into the linear cylindrical heater 108. The pressure control chamber 144 contains in the inside a turn table 136 for rotating rigid food containers by 90°.

The linear cylindrical heater 108 has an internal length of about 180 cm and is connected to a steam heater 140 and provided at the downstream end thereof with a pusher 152 for pushing rigid food containers in a direction of a right angle to the axis of the heater 108 and a turn table 149 such that the rigid food containers fed in by the pusher 146 are eventually rotated by 90° by the turn table 149 and then pushed and moved through the second gate valve 110 into the linear cylindrical cooler 116 by the pusher 152 as the latter extends.

The linear cylindrical cooler 116 has an internal length of about 180cm and is connected to a cooling device 150 and provided at the downstream end thereof with a pusher 154 pushing rigid food containers in a direction of a right angle to the axis of the cooler 116, said pusher 154 being so designed as to extend and push rigid food containers through a third gate valve 120 into a pressure control chamber 162, The linear cylindrical cooler 116 is additionally provided at the downstream end thereof with a turn tables 157 for rotating rigid food containers by 90°. The pressure control chamber 162 has therein a turn table 169 for rotating rigid food containers by 90° and a pusher 166 for pushing and moving rigid food containers into the discharge section 124.

The discharge section 124 has an internal length of about 60 cm and is provided at the downstream end thereof with a conveyor device 168 for conveying the food in the rigid food containers coming out from the apparatus.

ADVANTAGE OF THE INVENTION

A food sterilizing apparatus according to the invention is advantageous in that it has a simple configuration and can completely and efficiently sterilize food.

What is claimed is:

1. A food sterilizing apparatus for sterilizing food contained in rigid containers characterized in that it comprises a food supplying section, a linear cylindrical heater, a linear cylindrical cooler and a discharge section, each having inlet and outlet ports arranged respectively at the upstream and downstream ends thereof, any two adjacent ones of said component sections being connected in parallel or rectangularly with each other at the respective outlet and inlet ports thereof with a sealing gate interposed therebetween, said component sections being further provided with respective pushers disposed at the upstream end thereof for moving rigid food containers downstream, each of said pushers having a stroke at least equal to the width of a rigid container.

2. A food sterilizing apparatus according to claim 1, characterized in that said linear cylindrical food supplying section is provided with an deaerator.

3. A food sterilizing apparatus according to claim 1, characterized in that said sealing gates are gate valves.

4. A food sterilizing apparatus according to claim 1, characterized in that said linear cylindrical heater is provided at the upstream end thereof with a pressure control chamber.

5. A food sterilizing apparatus according to claim 1, characterized in that said second and subsequent pushers are provided with respective turn tables arranged in front of them.

6. A food sterilizing apparatus according to claim 1, characterized in that said discharge section is provided at the upstream end thereof with a pressure control chamber.

* * * * *